May 6, 1969  A. NATHAN  3,443,079
CASCADE MULTIPLIER
Filed Sept. 12, 1963  Sheet 1 of 5

INVENTOR

Amos Nathan

INVENTOR

Amos Nathan

United States Patent Office 3,443,079
Patented May 6, 1969

3,443,079
CASCADE MULTIPLIER
Amos Nathan, % Dept. of Electrical Engineering, Technion, Israel Institute of Technology, Haifa, Israel
Filed Sept. 12, 1963, Ser. No. 308,462
Int. Cl. G06g 7/16, 7/12
U.S. Cl. 235—194      15 Claims This invention relates to multipliers wherein an output signal is produced from two input signals, corresponding to the value of their product. More specifically, this invention provides multipliers wherein a plurality of signals is produced which are combined in a linear manner and yield an output signal approximating said product. Multipliers according to the invention include a plurality of cascade connected stages. The first stage is a converting stage; the second stage is either a converting stage or a multiplier.

A converting stage produces a converted output signal such that (1) it is a piecewise-linear function of the input signals; (2) a linear function thereof is a first approximation of the required product, and the error of approximation is itself the product of linear functions of converted signals.

Conversion is to be understood in the sense of U.S. Patent No. 801,469 and Amos Nathan, "Input Converters for Generators of Symmetric Functions," The Institution of Electrical Engineers (London), Monograph No. 522E, June 1962.

Because of property (1), converted signals can be produced with great accuracy. Because of (2) (a) one or more converting stages can by connected in cascade; (b) the accuracy increases, in general, with the number of converting stages used; (c) in a cascade multiplier of given accuracy, it is possible to use a multiplier of lower accuracy.

It is an object of the invention to provide multipliers producing an output signal as the sum of two or more signals, wherein at least one of said signals is a piecewise-linear function of the input signals.

It is a further object of the invention to provide means for the conversion of multipliers of given accuracy into multipliers of higher accuracy.

It is a yet further object of the invention to provide analog multipliers for the production of an output voltage representing the product of the instantaneous values of two input voltages.

A still further object of the invention is the provision of iterative analog or digital multipliers, wherein one converting stage is used two or more times in succession.

Figure 1:
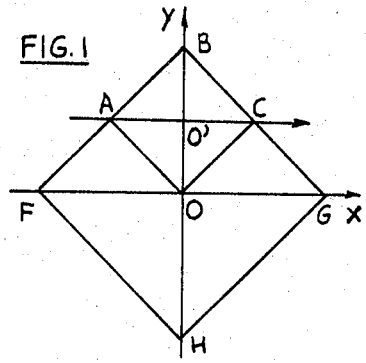
Figure 7:
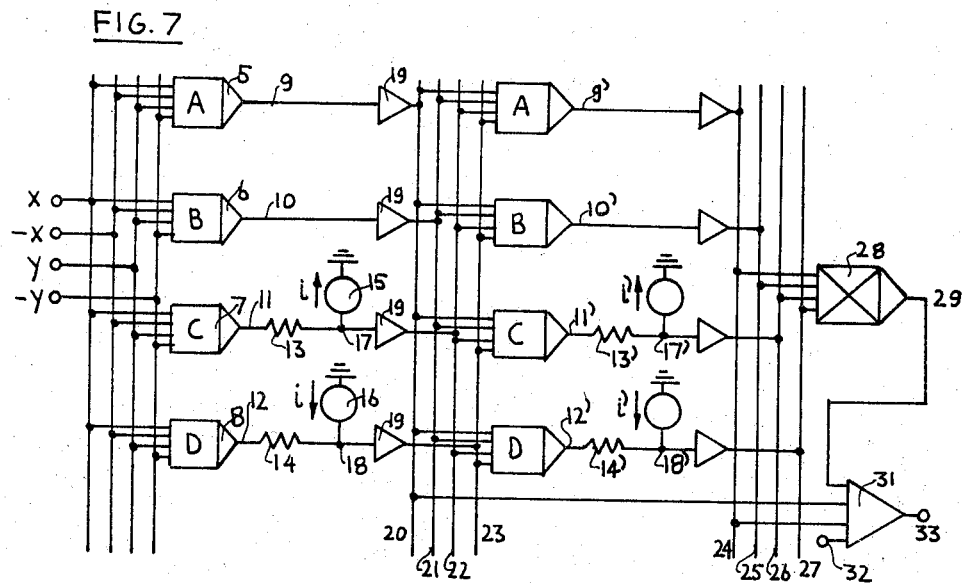
Figure 8:
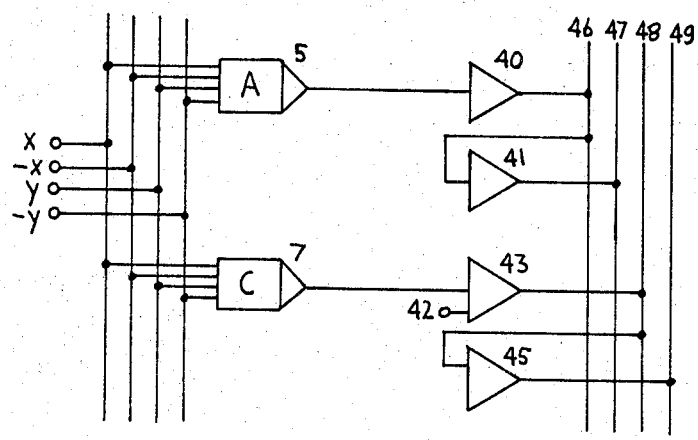
Figure 9:
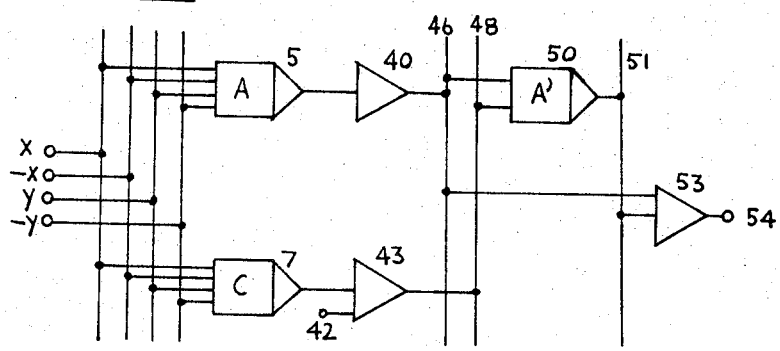
Figure 10:
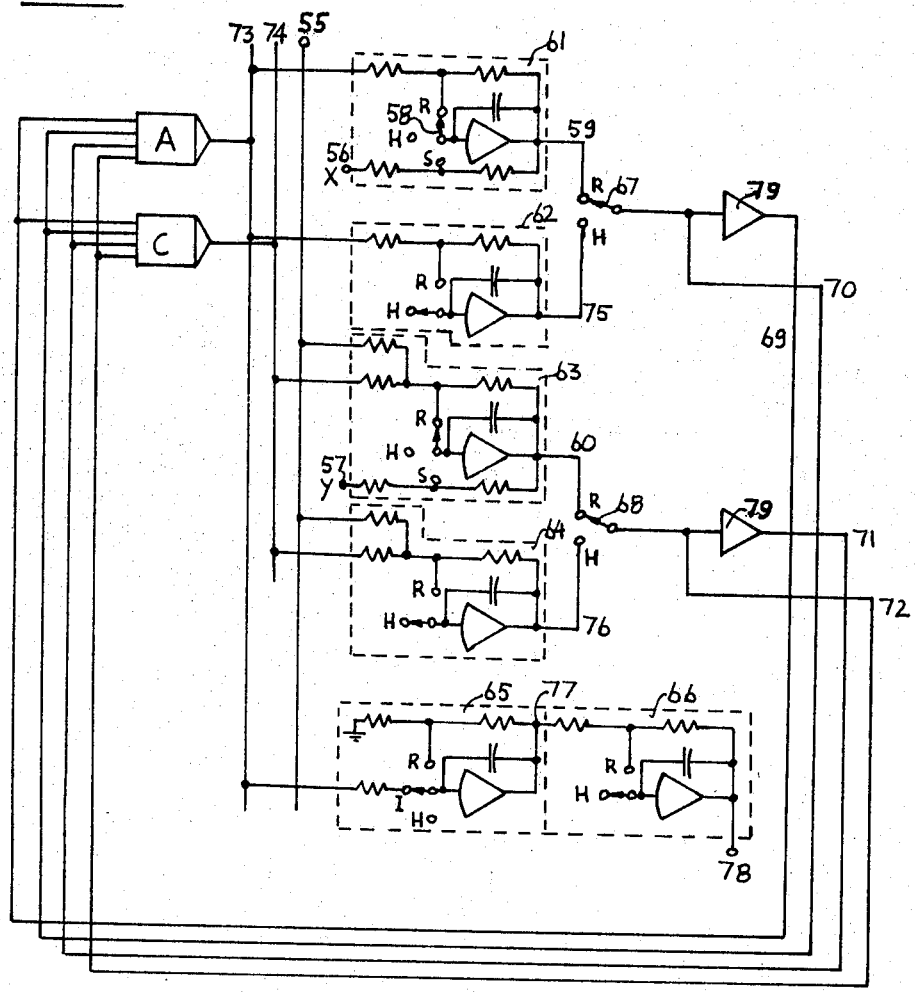
Figure 11:
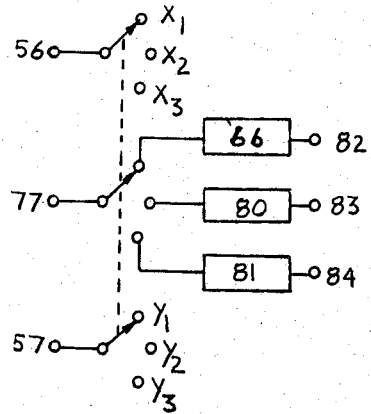
Figure 12:
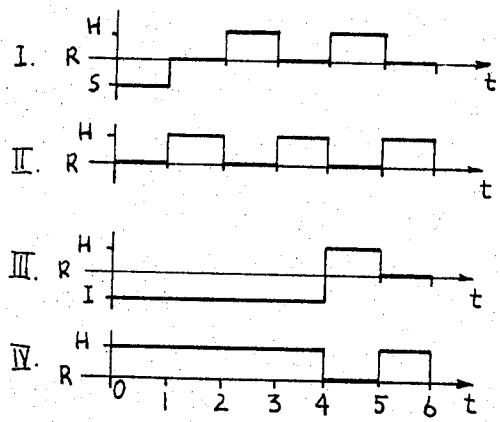
Figure 13:
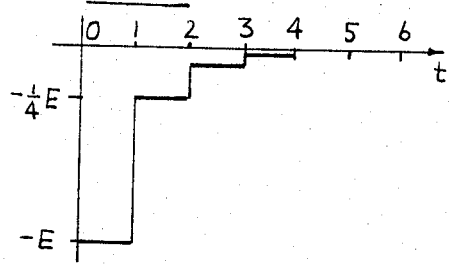
Figure 14:
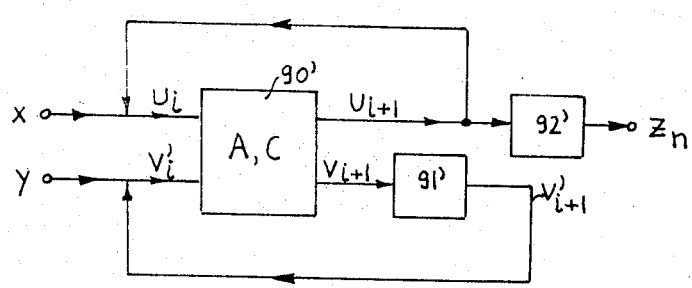
Figure 15:
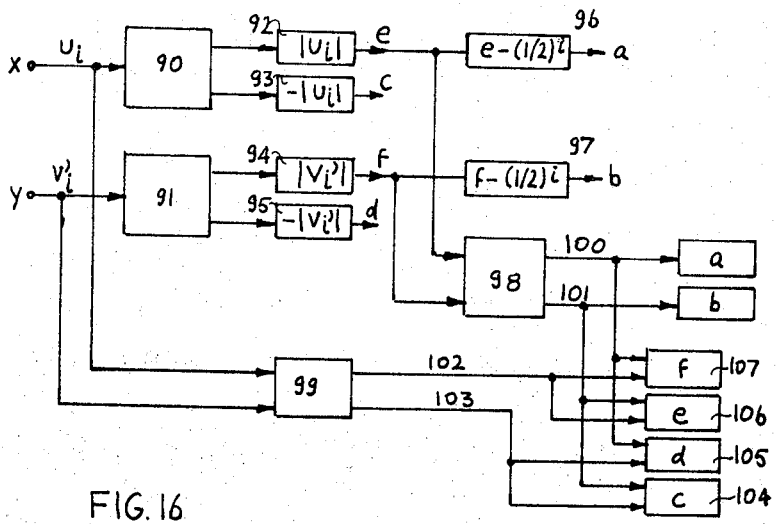
Figure 16:
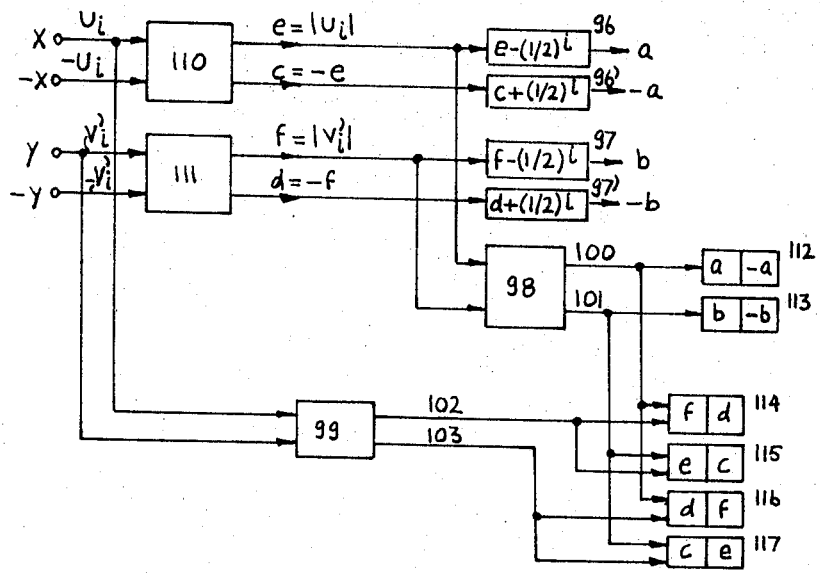

Further objects and advantages of the invention will become apparent from the following description taken in connection with the appended drawings, in which:

FIGURE 1 is a plot of the plane of variables;
FIGURES 2 to 6 are diagrams of converting circuits A, B, C, D, A'', which may be used in embodiments of the invention;
FIGURE 7 is a schematic diagram of one embodiment of the invention;
FIGURE 8 relates to another embodiment of the invention;
FIGURE 9 is a schematic diagram of a further embodiment of the invention;
FIGURES 10 and 11 relate to iterative analog embodiments of the invention;
FIGURE 12 plots the switching sequence of the example of FIGURE 10;
FIGURE 13 is a plot of an auxiliary voltage for FIGURE 10;
FIGURES 14 to 16 are flow diagrams relating to digital embodiments of the invention.

Consider the function (1) $\quad z = (1/M)xy$ where $M$ is an arbitrary positive constant, variables $x$ and $y$ are in domain HFBG, FIGURE 1, where $OG=OB=OF=OH=M$, and O is the origin of the $x,y$ co-ordinate system. Therefore, $-M \leq x, y \leq M$ and $z$ assumes its maximum value at $x=y=M/2$ and its minimum value at $x=-y=M/2$. Thus (2) $\quad -M/4 \leq z \leq M/4$ It has been shown in the references that (3) $\quad z = (1/M)u_1 v_1$ where $u_1, v_1$ are "converted" variables, (4) $\quad u_1 = \max(\min(x,y), \min(-x,-y))$
(5) $\quad v_1 = \max(x,y,-x,-y)$ and $u_1, v_1$ are restricted to domain OABC, FIGURE 1.

$u_1$ and $v_1$ can be determined from equivalent expressions, for example from (6) $\quad -u_1 = \min(\max(x,y), \max(-x,-y))$
(7) $\quad -v_1 = \min(x,y,-x,-y,)$
(8) $\quad u_1 = \max(\min(x,y), -\max(x,y))$
(9) $\quad -u_1 = \min(\max(x,y), -\min(x,y))$
(10) $\quad v_1 = \max(x,y,-\min(x,y))$
(11) $\quad u_1 = \min(\max(x,-y), \max(-x,y))$ The transformation

(12) $\quad v_1' = v_1 - M/2$ defines a $u_1, v_1'$ system of co-ordinates whose origin is at O', the center of OABC. $u_1, v_1'$ are restricted to region OABC.

From Equations 3 and 12,

(13) $\quad z = (1/M)(u_1)(v_1' + M/2) = \tfrac{1}{2} u_1 + z_1'$ where

(14) $\quad z_1' = (1/M) u_1 v_1'$

In OABC

(15) $\quad -\tfrac{1}{2}M \leq u_1, v_1' \leq \tfrac{1}{2}M$
(16) $\quad -M/16 \leq z_1' \leq M/16$ and the range of $z_1'$ is one quarter of the range of $z$. By Equations 13 and 16, $\tfrac{1}{2} u_1$ is a first approximation to $z$ and $z_1'$ is the error term.

If $z$ is computed by Equation 13 and $z_1'$ has a fractional error $e$ with respect to its range, the fractional error caused in $z$ is only $(\tfrac{1}{4})e$.

$z_1'$, Equation 14, can be expressed in a similar manner, defining in analogy with Equations 4 and 5

(17) $\quad u_2 = \max(\min(u_1, v_1'), \min(-u_1, -v_1'))$
(18) $\quad v_2 = \max(u_1, -u_1, v_1', -v_1'))$ and in analogy with equation (12)

(19) $\quad v_2' = v_2 - M/4,$ where $M/4$ is the signal shift which is equal to $\tfrac{1}{2}O'B$, FIGURE 1. It follows from Equation 14 that

(20) $\quad z_1' = (1/M)u_2 v_2 = (1/M)(u_2)(v_2' + M/4)$
$\quad\quad = (\tfrac{1}{4}) u_2 + z_2'$ where

(21) $\quad z_2' = (1/M) u_2 v_2'$
(22) $\quad -M/4 \leq u_2, v_2' \leq M/4$ and from Equation 13

(23) $\quad z=\frac{1}{2}u_1+(\frac{1}{4})u_2+z_2'$ $z_2'$ is maximum at $u_2=v_2'=\frac{1}{2}(M/4)=M/8$ and minimum at $u_2=-v_2'=M/8$, and therefore

(24) $\quad -M/64=-M/4^3 \leqslant z_2' \leqslant M/4^3=M/64$

In general, defining

(25) $\quad u_{i+1}=\max(\min(u_i, v_i'), \min(-u_i, -v_i'))$

(26) $\quad v_{i+1}=\max(u_i, -u_i, v_i', -v_i')$

(27) $\quad v'_{i+1}=v_{i+1}-M/2^{i+1}$ $z$ can be written, when $x$ and $y$ are in HFBG, FIGURE 1,

(28) $\quad z=z_n+z_n'$ where

(29) $\quad z_n=\frac{1}{2}u_1+(\frac{1}{2}^2)u_2+ \ldots +(\frac{1}{2}^n)u_n$ and

(30) $\quad z_n'=u_n v_n';$ and

(31) $\quad -M/4^{n+1} \leqslant z_n' \leqslant M/4^{n+1}$ so that, by Equation 2, the range of $z_n'$ is $\frac{1}{4}^n$ times the range of $z$. $z_n$, Equation 28, is therefore an approximation to $z$ to within a maximum fractional error of $$\pm\frac{1}{2}(\frac{1}{4}^n),$$

or, equivalently, a maximum absolute error $\pm M/4^{n+1}$, which should be compared with $z_{max}=M/4$.

The invention provides implementations of multipliers corresponding with Equation 28 or 29 in order to produce a product function.

Figure 2:
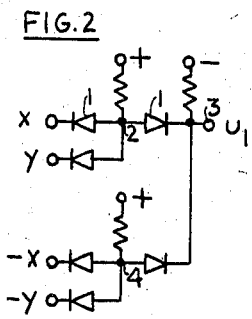
Figure 3:
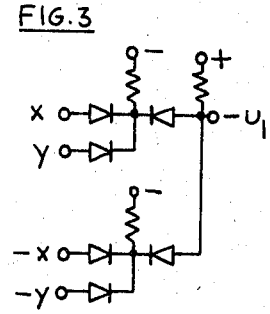
Figure 4:
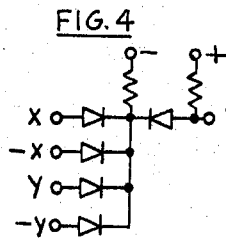
Figure 5:
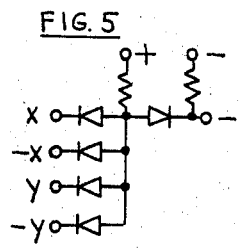

FIGURES 2, 3, 4, and 5 are schematic diagrams of converting circuits A, B, C, and D for the production of voltages $u_1$, $-u_1$, $v_1$, and $-v_1$, according to Equations 4, 6, 5, and 7, respectively, from input voltages $x$ and $y$ and their inverses. In these examples diodes 1 serve as selecting elements. In the circuit of FIGURE 2, for example, the smaller of $x$ and $y$ is selected at terminal 2 and the smaller of $-x$ and $-y$ is selected at terminal 4; subsequently the larger of the signals so selected is selected at terminal 3 where voltage $u_1$ is thus produced. Voltage $-x$ and $-y$ can be produced from $x$ and $y$ with the help of sign changers of unity gain.

Figure 6:
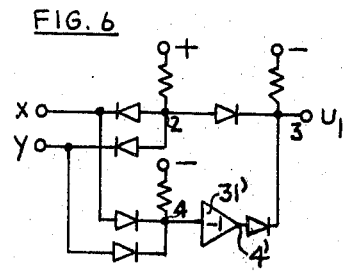

FIGURE 6 is a schematic diagram of an example of a converter producing voltage $u_1$ according to Equation 8. The input voltages are $x$ and $y$. The smaller of $-x$ and $-y$ is selected at terminal 4' by first selecting the larger of $x$ and $y$ at terminal 4 and subsequently changing its sign in sign changer 31'.

FIGURE 7 is a schematic diagram of one embodiment of a multiplier according to the invention corresponding to Equation 23. 5, 6, 7, and 8 are input converters A, B, C, D producing at terminals 9, 10, 11, 12 voltages $u_1$, $-u_1$, $v_1$, $-v_1$, respectively. The shifted voltage $v_1'$ is produced at terminal 17 by deducting from $v_1$ at terminal 11 the voltage drop produced in resistor 13 by a constant current $i$ which is withdrawn from terminal 17 by current generator 15. Terminal 17 is not loaded so that all the current $i$ flows through resistor 13. Voltage $-v_1'$ is similarly produced at terminal 18 by adding to $-v_1$ at terminal 12 the voltage rise in resistor 14 caused by current $i$ which is supplied to terminal 18. In this example, $M=100$ volts, and, by Equations 1 and 12, $z=(1/100)xy$ volts, $$v_1'=v_1-50$$

volts. 19 are impedance converters which transfer voltages $u_1$, $-u_1$, $v_1'$, and $-v_1'$ to lines 20, 21, 22, and 23, respectively, at a low impedance level, without substantially loading their input terminals.

A second converting stage is connected in cascade with the first stage and produces a second set of converted voltages $u_2$, $-u_2$, $v_2'$, $-v_2$ at terminals 9', 10', 11', 12', respectively, in a similar second stage, from $+u_1$, $-u_1$, $+v_1'$, and $-v_1'$ as input voltages according to Equations 17 and 18 and, by Equation 19, $v_2'=v_2-25$ volts and $-v_2'$ at terminals 17' and 18', respectively. The required shifts are produced in resistors 13' and 14'. The voltages at terminals 9', 10', 17', 18' are transferred to lines 24, 25, 26, 27, respectively, through impedance converters.

Multiplier 28 is connected in cascade with the second stage and produces voltage $z_2'$ at terminal 29 from voltages $u_2$, $-u_2$, $v_2'$, $-v_2'$ as input voltages. Sign changing adder 31, having gain $-A$, produces an output voltage equal to $-Az$ at terminal 33. At terminal 32 a constant voltage can be added to the output voltage. Only $\frac{1}{16}$ of any fractional error of multiplier 28 is contributed to the error of multiplication at output terminal 33.

FIGURE 8 is a schematic diagram of one stage of another embodiment of a multiplier according to the invention, producing voltages $2u_1$ and $2v_1'$. Voltages $u_1$ and $v_1$ are produced from voltages $x$, $-x$, $y$, and $-y$ in converters A and C, shown at 5 and 7. 40 is a sign changer of gain $-2$ and produces from $u_1$ voltage $-2u_1$ at line 46. 41 is a unity gain sign changer producing from $-2u_1$ voltage $2u_1$ at line 47. 43 is a sign changing adder of gain $-2$ producing voltage $-2v_1'$ at line 48 from voltage $-\frac{1}{2}M$ at terminal 42 and from $v_1$. 45 is a unity gain sign changing adder producing from $-2v_1'$ voltage $2v_1'$ at line 49. If $2u_1$, $-2u_1$, $2v_1'$, $-2v_1'$ replace $x$, $-x$, $y$, $-y$, respectively, as input voltages, there are produced at lines 46, 47, 48, 49 voltages $-4u_2$, $4u_2$, $-4v_2'$, $4v_2'$, respectively. Therefore, connecting in cascade $n$ stages, there are produced voltages $2u_1$, $4u_2 \ldots 2^n u_n$ and $z_n$, Equation 29, follows by addition from

(32) $\quad z_n=\frac{1}{4}(2u_1)+\frac{1}{16}(4u_2)+ \ldots +\frac{1}{4^n}(2^n u_n)$ A time sharing embodiment of the invention need use only one device corresponding to FIGURE 8. Voltages $2u_1$, $4u_2 \ldots 2^n u_n$ are produced in succession at line 46. For this purpose, voltage $2u_1$ is stored in store S, say, and voltages $2u_1$ and $2v_1'$ are stored in store T. Voltages $-2u_1$ and $-2v_1'$ are produced. $2u_1$, $-2u_1$, $2v_1'$, $-2v_1'$ are subsequently used as input signals instead of $x$, $-x$, $y$, $-y$, respectively, thereby producing $4u_2$, $-4u_2$, $4v_2'$, $-4v_2'$ on lines 47, 46, 49, 48, respectively. ($\frac{1}{4}$)$4u_2$ is added to voltage $2u_1$ in store S. $4u_2$ and $4v_2'$ next replace $2u_1$ and $2v_1'$, respectively, in store T, and the cycle is repeated. After $n$ cycles the signal in store S is $4z_n$. This signal is transferred to an output store. Next store T is cleared and new values $x$, $-x$, $y$, $-y$ are used as input signals, and the process is continued. It is evidently possible to use this system in order to provide the product of two or more pairs of variables. For this purpose, as in any time-sharing system, the device is used successively to provide the required products, by means of suitable input and output switching. A plurality of stores $s$ is required for the purpose, one each for each required product, but only one device corresponding to FIGURE 8 is required.

Alternatively, in FIGURE 8, adders 40 and 43 have a gain $-1$ and the circuit produces $u_1$, $-u_1$, $v_1'$, $-v_1'$ at lines 47, 46, 49, 48, when $x$, $-x$, $y$, $-y$ are the input voltages. If these are replaced by $u_{i-1}$, $-u_{i-1}$, $v_{i-1}'$, $-v_{i-1}'$, respectively, and the voltage at terminal 42 is made equal to $M/2^i$, the circuit produces voltages $u_i$, $-u_i$, $v_i'$, $-v_i'$.

A still further embodiment of the invention will be described in connection with FIGURE 9. Voltages $-u_1$ and $-v_1'$ are produced on lines 46 and 48, respectively, as before. Converter A', 50, produces therefrom at line 51 signal $-u_2$ and sign changing adder 53 produces at terminal 54 the voltage $z_2=\frac{1}{2}u_1+\frac{1}{4}u_2$ which is an approximation to $z$ having a maximum fractional error of $\pm\frac{1}{32}$. A' can be implemented, for example, in correspondence with Equation 9, according to $$-u_2=\min(\max(-u_1, -v_1'), -\min(-u_1, -v_1'))$$

in a circuit corresponding with that of FIGURE 6 but having diodes and voltage sources of reversed polarity.

FIGURE 10 is a schematic diagram of an example of a repetitive embodiment of the invention, in which one converting stage is used on a time sharing basis. In this example, there are 6 time intervals to a computing cycle. Converters A and C produce at lines 73 and 74 voltages $u_1$ and $v_1$, respectively, from input voltages $x$, $-x$, $y$, and $-y$ at lines 69, 70, 71, 72, respectively, during the first computing interval, and $\frac{1}{2}u_1$, $\frac{1}{2}v_1'$, $-\frac{1}{2}u_1$ and $-\frac{1}{2}v_1'$ are produced therefrom. During the second interval, $\frac{1}{2}u_1$, $-\frac{1}{2}u_1$, $-v_1'$, $-\frac{1}{2}v_1'$ replace $x$, $-x$, $y$, $-y$ at lines 69, 70, 71, 72, respectively, causing the production of $\frac{1}{2}u_2$ and $\frac{1}{2}v_2$ at lines 73 and 74, respectively. In a similar manner $(\frac{1}{4})u_3$ and $(\frac{1}{4})v_3'$ are produced in the third interval and $(\frac{1}{8})u_4$ and $(\frac{1}{8})v_4'$ in the fourth interval. The voltage $kz_4$, where $k$ is a constant of proportionality and $z_4$ is given by $$z_4 = \frac{1}{2}u_1 + (\frac{1}{4})u_2 + (\frac{1}{8})u_3 + (\frac{1}{16})u_4$$

is produced at output terminal 78 from $2(\frac{1}{2}^i)u_i$; $i=1, 2 \ldots 4$; at terminal 73.

Switching, storage, transfer and output production are performed in the example in circuits including integrating circuits 61–66. Integrators 61 and 63 can be in one of three states, H, R and S; integrators 62, 64 and 66 can be in the two states H and R; integrators 65 can be in three states, H, R and I; according to the position of their associated change-over elements, such as 58 in integrator 61. Except for integrator 65, these units are not used as integrators proper, but rather for signal storage and transfer, and the term "integrator" derives from the circuit configuration. The sequence of positions of the change-over elements during one cycle is shown in FIGURE 12. Curve I applies to integrators 61 and 63; curve II to integrators 62 and 64; curve III to integrator 65; curve IV to integrator 66. Curve II further applies to change-over switches 67 and 68. The voltage at terminal 69 is switched in accordance with the curve shown in FIGURE 13.

The letters H, R and S denote "hold," "reset" and "start," and the letter I denotes "integrate."

Voltage $x$ is received by integrator 61 at terminal 56. During the first interval this integrator is in state S and voltage $-x$ is produced at terminal 59 and transferred through switch 67, in state R, to line 70. Unity gain sign changer 79 produces from $-x$ the voltage $x$ on line 69. Integrator 63 receives at terminal 57 voltage $y$ and similarly produces $y$ and $-y$ at lines 71, 72, respectively. Converters A and C thus produce on lines 73 and 74 voltages $u_1$ and $v_1$, respectively.

Integrator 65 receives voltage $u_1$ at line 73 during the first interval. Integrators 62 and 64 are in their R position and produce at their output terminals 75, 76 voltages $-\frac{1}{2}u_1$ and $-\frac{1}{2}v_1'$, respectively. Integrator 62 functions as a sign changer of gain $-\frac{1}{2}$, while in position R, while integrator 64 functions as a sign changing adder, receiving voltage $-E$ on line 55 and voltage $v_1$ on line 74 and producing therefrom voltage $-\frac{1}{2}v_1'$. During the second interval, voltage $-\frac{1}{2}u_1$ at terminal 75 is held by integrator 62, now in the hold position, $-\frac{1}{2}u_1$ is transferred through switch 67 to line 70 and voltage $\frac{1}{2}u_1$ is produced therefrom in sign changer 79 at line 69. Similarly, voltages $\frac{1}{2}v_1'$ and $-\frac{1}{2}v_1'$ are produced on lines 71 and 72, respectively. Converters A and C thus produce at lines 73 and 74 voltages $\frac{1}{2}u_2$ and $\frac{1}{2}v_2$, respectively. Integrator 61, now in the reset position, produces $-(\frac{1}{4})u_2$ at terminal 59 and integrator 63 produces $-(\frac{1}{4})v_2'$ at terminal 60 from $\frac{1}{2}v_2$ at line 74 and the new voltage $-(\frac{1}{4})E$ at terminal 55. Integrator 65 receives voltage $u_1$ during this second interval. Similar third and fourth intervals follow, and the voltages at line 73 are $(\frac{1}{4})u_3$ in the third and $(\frac{1}{8})u_4$ in the fourth interval. In the fifth interval integrator 65 is in the hold position. The voltage produced at output terminal 77 of integrator 65 at the end of the fourth interval is proportional to $-z_4$, as required. This voltage is held during the fifth interval. Integrator 66, in the reset position during this interval, functions as a sign changer and thus produces a voltage proportional to $-(-z_4) = z_4$ at its output terminal 78.

During the sixth interval, integrator 65 is in the reset position and produces voltage zero at terminal 77 and integrator 66 is in the hold position, which it maintains during the next five intervals, thus holding a constant output voltage. The seventh interval is identical with the first and a new cycle begins, operating upon new values $x$ and $y$.

The device can be used in an evident manner to produce the products of two or more pairs of voltages $x$ and $y$. For each pair a separate integrator 66 is required and switching proceeds in successive computing cycles in order to receive the associated $x$, $y$ pairs and to feed the result of computation into the associated integrator 66.

FIGURE 11 shows the switching of input voltages and of holding integrators 66 required if three pairs of products, $x_1y_1$, $x_2y_2$, $x_3y_3$, are to be produced in the circuit of FIGURE 10. The three holding integrators 66, 80, 81 replace 66. Output terminal 78 is replaced by terminals 82, 83, 84. 56 and 57 are the $x$ and $y$ input terminals of integrators 61 and 63, respectively, and 77 is the output terminal of integrator 65, FIGURE 10. Switching occurs once every computing cycle. Thus any input voltage is received during one cycle and skipped during the following two cycles.

An alternative way of carrying out the invention applies the same voltage $-E$ at terminal 55, FIGURE 10, throughout all intervals and uses intervals of varying duration. The second, third and fourth intervals being $\frac{1}{4}$, $\frac{1}{16}$, $\frac{1}{64}$ times the first interval, respectively. Integrators 61–64 have four times the gain described above, when in position R, so that, for example, $-2u_1$ is produced at terminal 75 from $u_1$ at terminal 73, during the first interval. The duration of the fifth and sixth intervals is of no consequence. The sequence of voltages thus produced at line 73 is $u_1$, $2u_2$, $4u_3$, $8u_4$. Integrator 65 produces therefrom at the end of the fourth interval a voltage proportional to $$-(u_1 + (\frac{1}{4}) \cdot 2u_2 + (\frac{1}{16}) \cdot 4u_3 + (\frac{1}{64}) \cdot 8u_4)$$
$$= -(u_1 + \frac{1}{2}u_2 + (\frac{1}{4})u_3 + (\frac{1}{8})u_4) = -z_2$$

as required.

In fast embodiments of the invention electronic switches are used in order to perform all the switching operations.

It is by no means an essential feature of the invention that variables be represented as continuously variable voltages. Analog embodiments of the invention can use representation of variables in the form of currents or as mechanical quantities, for example. Any representation permitting the operations of maximum and/or minimum selection, signal shift and change of sign as well as addition can be used in order to carry out the invention. Moreover, variables need not even be represented in analog form, but may be represented in digital form as will now be described in detail by way of example.

Digital devices for the performance of storage, signal shift, change of sign, selection and addition are of the prior art. FIGURE 14 is a flow diagram showing the organization of a binary multiplier according to the invention. The value of the quantity M as defined in connection with FIGURE 1 is taken as 2 and $x$ and $y$ are limited to $-1 \leq x, y \leq 1$, which ensures that $x, y$ is in domain HFBG, FIGURE 1, as required.

Number representation is, for example, in a two's complement manner using $m$ bits, or digits. From $x=u_0$ and $y=v_0'$ received by block 90' there are produced $u_1$ and $v_1$, requiring the A and C operations defined in Equations 4 and 5, respectively. Block 91' receives $v_1$ and produces therefrom $v_1'$ as defined in Equation 12, where $M=2$, i.e. $v_1' = v_1 - 1$. Block 92 receives $u_1$ and stores $\frac{1}{2}u_1$. $u_1$ and $v_1'$ subsequently replace $x$ and $y$ as inputs to block 90'.

In general, a computing cycle produces from $u_i$ and $v_i'$ in block 90' the numbers $u_{i+1}$ and $v_{i+1}'$, and in block 91' from $v_{i+1}$ the number $v_{i+1}' = v_{i+1} - (\frac{1}{2})^i$, and adds $(\frac{1}{2})^{i+1} \cdot u_{i+1}$ to the number stored in block 92'. Multiplication by $\frac{1}{2}$ and its powers is accomplished by a shift, one place to the right for each power, i.e. $i+1$ places to the right for $(\frac{1}{2})^{i+1}$.

An example of carrying out the invention according to the scheme of FIGURE 14 will be described in greater detail in connection with the diagram of FIGURE 15. It follows from Equations 25–27, with $M=2$, that

(33)  $v_{i+1}' = \max(|u_i|, |v_i'|) - (\frac{1}{2})^i$

Moreover, for $u_{i+1}$ there is the alternative (a) if the signs of $u_i$ and $v_i'$ are equal then

(34)  $u_{i+1} = \max(\min(|u_i|, |v_i'|), -\max(|u_i|, |v_i'|))$
      $= \min(|u_i|, |v_i'|);$  $(u_i \cdot v_i' \geq 0)$ (b) if the signs of $u_i$ and $v_i'$ are opposite then

(35)  $u_{i+1} = \max(-|u_i|, -|v_i'|) = -\min(|u_i|, |v_i'|);$  $(u_i \cdot v_i' < 0)$ The system must produce $u_{i+1}$ and $v_{i+1}'$ from $u_i$ and $v_i$. Blocks 90 and 91 accept $u_i$ and $v_i'$, and produce $-u_i$ and $-v_i'$, respectively, by sign changing. Block 90 further selects the positive of $u_i$ and $-u_i$, i.e. $|u_i|=e$, and produces it as 92 and the negative, $-|u_i|=c$ and produces it at 93. Block 91 simultaneously produces $|v_i'|=f$ at 94 and $-|v_i'|=d$ at 95. 96 and 97 produce from $e$ and $f$ the quantity $a=|u_i|-(\frac{1}{2})^i$ and the quantity $b=|v_i'|-(\frac{1}{2})^i$, respectively.

Block 98 compares $|u_i|$ with $|v_i'|$ and activates line 100 if $|u_i|\geq|v_i'|$ and line 101 otherwise, selecting the quantity $a$ in 96 if $|u_i|\geq|v_i'|$ and the quantity $b$ in 97 if $|u_i|<|v_i'|^{\frac{1}{2}}$. The selected quantity is $v_{i+1}'$.

Block 99 compares the signs of $u_i$ and $v_i'$ and activates line 102 if the signs are equal and line 103 otherwise. Blocks 104–107 determine which of the quantities $c$, $d$, $e$ and $f$ equals $u_{i+1}$, in accordance with cases (a) and (b) above. For example, if line 102 is activated, i.e. case (a) applies, and simultaneously $|u_i|<|v_i'|$, so that line 101 is activated, only at 106 are both incoming lines activated and this block carries out selection; it selects the quantity $e=|u_i|$ in accordance with Equation 34. The three other cases are dealt with in an analogous manner. $u_i$ and $v_i'$ are next replaced by $u_{i+1}$ and $v_{i+1}'$ which are now known. The process is initiated with $x=u_0$ and $y=v_0'$ and carried on a sufficient number of times in order to give the required product $xy$ with sufficient accuracy.

FIGURE 16 is a block diagram of a digital embodiment of the invention that is a variation of the embodiment corresponding to FIGURE 15. Blocks 110 and 111 receive $u_i$ and $v_i'$, respectively, as before, but now also their inverses are so received. Block 110 produces signals $e$ and $-e$ on different lines, and no sign changing is required for the purpose. Block 111 similarly produces $f$ and $d$. Blocks 96 and 97 produce $a$ and $b$ as before, and blocks 96' and 97' simultaneously produce $-a$ and $-b$ from $c=-e$ and $d=-f$, respectively, according to the relations $$-a = -e + (\frac{1}{2})^i$$
$$-b = -f + (\frac{1}{2})^i$$

Blocks 98 and 99 function as before. The $v_{i+1}'$ selectors are blocks 112 and 113 which select in this embodiment both $v_{i+1}'$ and $-v_{i+1}'$, respectively, in accordance with the symbols written in the left and right part thereof, respectively. Thus, if line 100 is activated, for example, block 112 is active and selects $a$ and $-a$ as $v_{i+1}'$ and $-v_{i+1}'$, respectively. Blocks 114–117 are the $u_{i+1}$ selectors, selecting both $u_{i+1}$ and $-u_{i+1}$ in accordance with the symbols in the left and right parts thereof, respectively. Thus, if lines 101 and 102 are activated, block 115 is active and $e$ and $c$ are selected as $u_{i+1}$ and $-u_{i+1}$, respectively. In the next cycle, $u_{i+1}$, $-u_{i+1}$, $v_{i+1}'$, $-v_{i+1}'$ replace $u_i$, $-u_i$, $v_i'$, $-v_i'$, respectively, as input quantities. The first cycle begins with $x=u_0$; $-x=-u_0$; $y=v_0'$; $-y=-v_0'$.

The number $n$ of required computing cycles to give $z$ with a given accuracy, follows from Equation 31, with $M=2$, recalling that $z_n'$ is the error term. The term "cycle" as used above in connection with the description of digital embodiments of the invention corresponds to the term "interval" in the description of repetitive analog embodiments of the invention.

Although this invention has been described and illustrated in detail it is to be clearly understood that the same is by way of illustration and example only and is not to be taken by way of limitation.

What I claim is:

1. A cascade multiplier for the production of an output quantity representing the product of first and second variables, comprising first and second means for receiving first and second input quantities representing said variables, respectively; a first stage connected thereto for producing by a process of selection of maximum and minimum of said quantities and their inverses, first and second converted quatities, wherein said first converted quantity corresponds with a first approximation of said output quantity; means adapted to effect a predetermined shift of said second converted quantity to produce a third converted quantity; generating means responsive to said first and third converted quantities for producing therefrom at least one further quantity such that a linear function thereof and of said first converted quantity corresponds with an improved approximation of said output quantity; and linear combining means arranged to receive said first converted quantity and said further quantity for producing said output quantity.

2. The multiplier as claimed in claim 1, wherein a linear function of said first converted quantity and the product of said first and third converted quantities represents said output quantity.

3. The multiplier as claimed in claim 2 wherein said first stage is adapted to produce said first converted quantity by a process of selection of one of (1) one of said first and second input quantities having a predetermined magnitude relation with respect thereto and (2) one of the inverse of said first and the inverse of said second input quantities having a predetermined magnitude relation with respect thereto; and to produce said second converted quantity by a process of selection of one of said first and second input quantities and their inverses having a predetermined magnitude relation with respect thereto.

4. The multiplier as claimed in claim 3, wherein said generating means includes means for producing a further converted quantity corresponding with the greater of (1) the smaller of said first and the third converted quantities and (2) the smaller of their inverses, said further converted quantity representing said further quantity.

5. A cascade multiplier for the production of an output quantity representing the product of first and second variables, comprising first and second means for receiving first and second input quantities representing said variables, respectively; a first stage connected thereto and having said quantities as first and second input quantities, respectively; and including $n+1$ stages, the $(i+1)$th thereof connected to the $i$th thereof; where $n$ is a positive integer and $i=1,2\ldots n$; wherein the $i$th stage is adapted to produce associated first, second and third converted quantities; the $(i+1)$th stage having said $i$th first and third converted quantities as first and second input quantities, respectively; each of said plural stages including first means for producing said associated first converted quantity by a process of selection of one of (1) one of its said input quantities having a predetermined magnitude relation with respect thereto and (2) one of the inverse of its said input quantities having a predetermined magnitude relation with respect thereto; said stage including second means for producing said associated second converted quantity by a process of selection of one of its input quantities and their inverses having a predetermined magnitude relation with respect thereto, and means to effect a shift of said second converted quantity to produce said associated third converted quantity; said cascade multiplier including combining means arranged to receive said plural first converted quantities for producing said output quantity; and wherein said first converted quantity associated with said first stage corresponds with a first approximation of said output quantity and a linear function of said first converted quantities associated with said first and second stages corresponds with an improved approximation of said output quantity.

6. A time sharing multiplier comprising the device as claimed in claim 5, wherein said generating means includes means for storing said first converted quantity and at least one of said second and third converted quantities; means for replacing said first and second input quantities by said first and third converted quantities to cause the production in said first stage of a second pair of converted quantities, during a second computing interval; means adapted to cause the repetition of the process of production of converted quantities in said first stage $n+1$ times, where $n$ is a positive integer; said combining means arranged to receive said plural first converted quantities.

7. An analog cascade multiplier comprising the device as claimed in claim 1, wherein said quantities are represented by the values of corresponding analog signals.

8. The device as claimed in claim 7, wherein said analog signals are in the form of electric potentials.

9. The multiplier as claimed in claim 8 and including resistive means connected in the signal path arranged to be traversed by a predetermined current to cause a predetermined potential difference therein for producing said shift of said second converted quantity.

10. The device as claimed in claim 8 wherein said first stage includes a plurality of diode means responsive to selected ones of said first and second input quantities and their inverses, said diode means having a common output connection for the production of said second converted quantity thereat.

11. An analog cascade multiplier comprising the device as claimed in claim 5, wherein said quantities are represented by the values of corresponding analog signals.

12. An analog cascade multiplier comprising the device as recited in claim 5 and including multiplier means connected to said $(n+1)$th stage for producing a product quantity corresponding with the product of said first and third converted quantities associated therewith; said combining means being arranged to receive said product quantity.

13. The device as claimed in claim 7 wherein said generating means includes multiplier means for the production of said further quantity.

14. The multiplier as claimed in claim 6, wherein said quantities are represented by the values of corresponding analog signals.

15. The multiplier as claimed in claim 14, wherein said repeated process is arranged to include a sequence of intervals of decreasing duration.

No references cited.

MALCOLM A. MORRISON, *Primary Examiner.*

J. F. RUGGIERO, *Assistant Examiner.*

U.S. Cl. X.R.

307—229

UNITED STATES PATENT OFFICE
CERTIFICATE OF CORRECTION

Patent No. 3,443,079                                        May 6, 1969

Amos Nathan

It is certified that error appears in the above identified patent and that said Letters Patent are hereby corrected as shown below:

Column 2, line 62, "$M/_4$," should read -- $M/4$, --. Column 3, line 53, "5, 6, 7, and 8" should read -- $\underline{5}$, $\underline{6}$, $\underline{7}$, and $\underline{8}$ --; line 72, "$v_2'$" should read -- $v_2$ --. Column 4, line 1, "17" should read -- $17'$ --; line 50, "s" should read -- S --. Column 8, line 18, "quatities" should read -- quantities --.

Signed and sealed this 21st day of April 1970.

(SEAL)
Attest:

Edward M. Fletcher, Jr.                            WILLIAM E. SCHUYLER, JR.
Attesting Officer                                              Commissioner of Patents